US008150779B1

(12) United States Patent
Gauvin

(10) Patent No.: US 8,150,779 B1
(45) Date of Patent: Apr. 3, 2012

(54) VALIDATING THE DETECTION OF SPAM BASED ENTITIES IN SOCIAL NETWORKING CONTEXTS

(75) Inventor: William Joseph Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 479 days.

(21) Appl. No.: 12/476,069

(22) Filed: Jun. 1, 2009

(51) Int. Cl.
*G06Q 99/00* (2006.01)
*G06F 11/00* (2006.01)

(52) U.S. Cl. .......................................... 705/319; 726/25
(58) Field of Classification Search .................. 705/319; 726/25
See application file for complete search history.

(56) References Cited

OTHER PUBLICATIONS

Kellep A. Charles. "Decoy Systems: A New Player in Network Security and Computer Incident Response" International Journal of Digital Evidence, Winter 2004, vol. 2, Issue 3.*

Webb, S., Cavarlee, J., and Pu, C. "Social Honeypots: Making Friends With a Spammer Near You." In Proc. of CEAS (2008).*
Jon M. Kleinberg; "Authoritative Sources in a Hyperlinked Environment"; Ithaca, NY; May 1997.

* cited by examiner

*Primary Examiner* — Jami A Plucinski
*Assistant Examiner* — Maame Ofori-Awuah
(74) *Attorney, Agent, or Firm* — Brill Law Office; Jeffrey Brill

(57) ABSTRACT

A validation system validates the detection of spam based entities in social networking contexts. Suspected spam based social networking entities are detected in a social networking site. A virtual social networking group is created that emulates a plurality of user profiles on the social networking site, including a user profile comprising a suspected spam based entity. A link in an emulated suspected spam based entity in the created virtual social networking group is invoked, resulting traffic is emulated, and the results are monitored. Responsive to the monitored results, it is determined whether to validate the suspected spam based entity. A validation indication specifying at least whether the suspected spam based entity has been validated can be stored for future reference, and/or transmitted to, e.g., the social networking site or a centralized security service.

20 Claims, 6 Drawing Sheets

US 8,150,779 B1

VALIDATING THE DETECTION OF SPAM BASED ENTITIES IN SOCIAL NETWORKING CONTEXTS

TECHNICAL FIELD

This disclosure pertains generally social networking site security, and more specifically to validating the detection of spam-profiles and spam-blogs in social networking contexts.

BACKGROUND

Social networking sites, such as MySpace and Facebook, are very widely used today. Social networking allows the building of online communities of people who share similar interests or backgrounds. Each user of a web based social networking site maintains their own profile. Social networking sites provide a variety of ways for users to interact, such as e-mail, instant messaging, posting text to the profiles of other users, blogging on their own profiles, etc.

As social networking sites have become more popular, spam-profiles (sprofs) have become a problem. A sprof is a fake social networking site profile that is created to direct viewers to an off-domain site, either to expose the users to the off-domain site, or to increase search engine or other rankings of the off-domain site. More specifically, a sprof can attempt to direct viewers to a site associated with the sprof to promote the site, to increase the PageRank or backlink portfolio of the site, to artificially inflate paid advertisement impressions from visitors, and/or to get a new site indexed. These sprof associated, off-domain sites can be commercial and/or pornographic in nature. Additionally, these sites can install malicious code on the computers of viewers. The direction of the viewer of the sprof to the off-domain site can be direct (i.e., viewing the sprof navigates the viewer to the off-domain site) or indirect (the sprof contains one or more links to the off target site). Note that a sprof is not a legitimate profile of a bona fide member of a social network, but instead is a dummy profile, which is simply used to entice the viewer to navigate to an off-domain site.

A related problem that manifests itself on social networks is spam-blogs (splogs), which are similar in nature to sprofs. A splog is an artificially created blog, which is used to promote associated websites or to increase the search engine rankings of associated sites. Splogs typically contain at least one implicit or explicit link to a site associated with the splog creator. Such splog associated sites are often disreputable, malicious or at best useless. Some splogs attempt to replicate themselves by posting their content, including the links to off-domain sites, to other user profiles.

Techniques can be used to attempt detect sprofs and splogs within a social network environment. However, conventional methods for detecting sprofs and splogs are subject to false positives. It would be desirable to address these issues.

SUMMARY

A validation system validates the detection of spam based entities (such as spam-profiles and spam-blogs) in social networking contexts. Suspected spam based social networking entities are detected in a social networking site. A virtual social networking group is created that emulates a plurality of user profiles on the social networking site (for example profiles suspected of being targeted or otherwise affected by the spam based entity), including a user profile comprising a suspected spam based entity. In some embodiments, a social networking group on the social networking site is defined (e.g., by using a modified version of Kleinberg's authoritative hub algorithm), and emulated to create the virtual social networking group. In some embodiments, the virtual social networking group is created by inserting an emulation of a user profile suspected of comprising a spam based entity into a pre-defined, virtual social networking group. In order to create the virtual social networking group, data concerning the detection of suspected spam based entities, data concerning user profiles suspected of being affected by spam based entities and/or data concerning a defined social networking group can be received from the social networking site. The virtual social networking group is isolated from the social networking site, for example by being created in the system memory of a computer on which the validation system is instantiated. A link in an emulated suspected spam based entity in the created virtual social networking group is invoked, traffic to and from the suspected spam based entity that results from invoking the link is emulated, and the results of invoking the link and emulating the traffic to and from the suspected spam based entity are monitored. Responsive to the monitored results of invoking the link and emulating the resulting traffic, it is determined whether to validate the suspected spam based entity as comprising an actual, spam based entity. For example, the suspected spam based entity can be validated responsive to the invoking of the link resulting in an attempt to publish content to other emulated user profiles, or an attempt to negotiate to a suspicious off-domain site. A validation indication specifying whether the suspected spam based entity has been validated can be stored for future reference, and/or transmitted to another party such as the social networking site or a centralized security service. The validation indication can also include metadata concerning detected spam based activity, as well as a signature identifying the spam based entity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
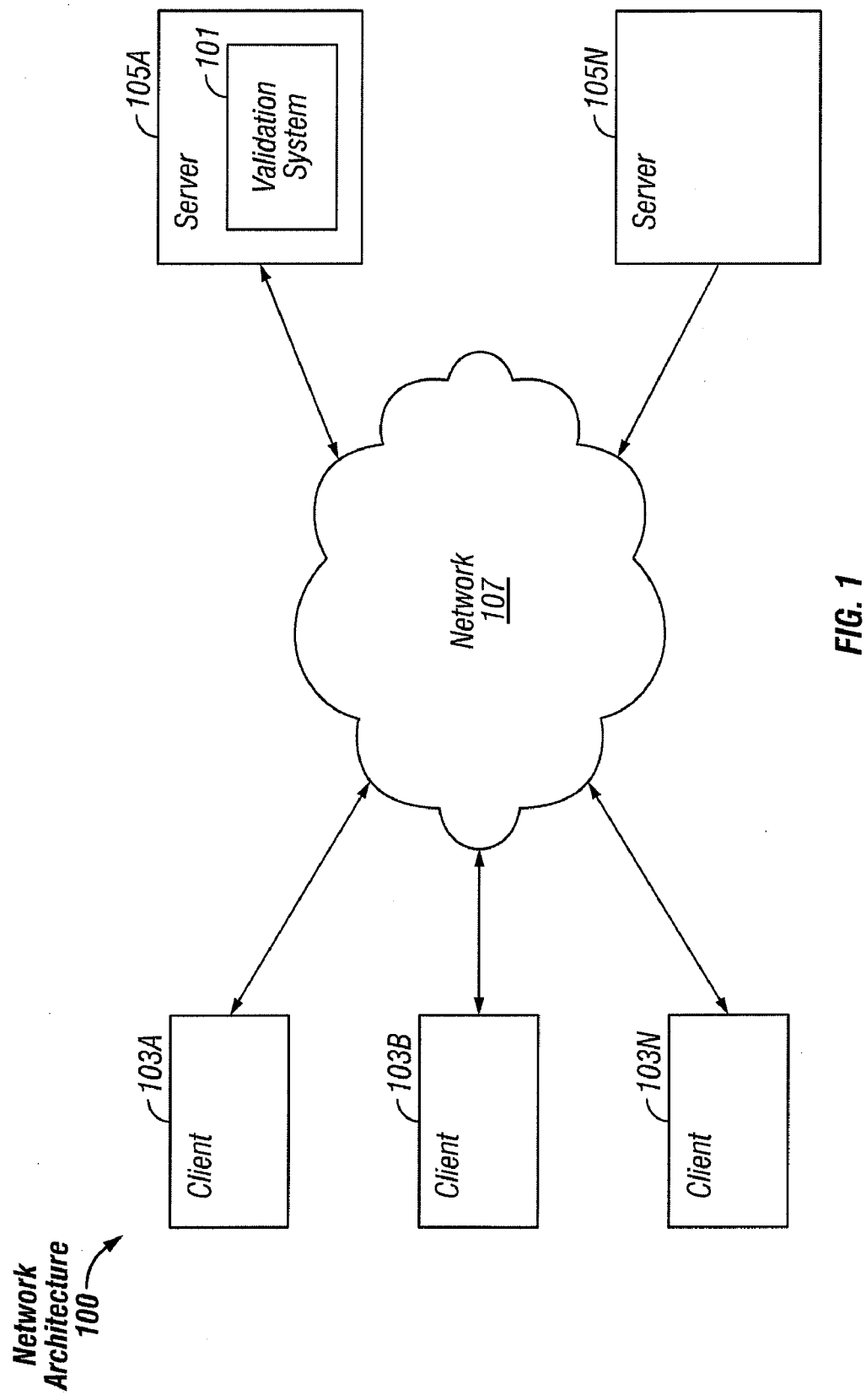
FIG. 1 is a block diagram of an exemplary network architecture in which a validation system for validating the detection of spam based entities in a social networking context can be implemented, according to some embodiments.

FIG. 1 is a block diagram illustrating an exemplary network architecture 100 in which a validation system 101 for validating the detection of sprofs 303, splogs 305 and similar types of spam based entities in a social networking context can be implemented. The illustrated network architecture 100 comprises multiple clients 103A, 103B and 103N, as well as multiple servers 105A and 105N. In FIG. 1, the validation system 101 is illustrated as residing on server 105A. It is to be understood that this is an example only, and in various embodiments this system 101 can be instantiated on a client 103, a server 105 or distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
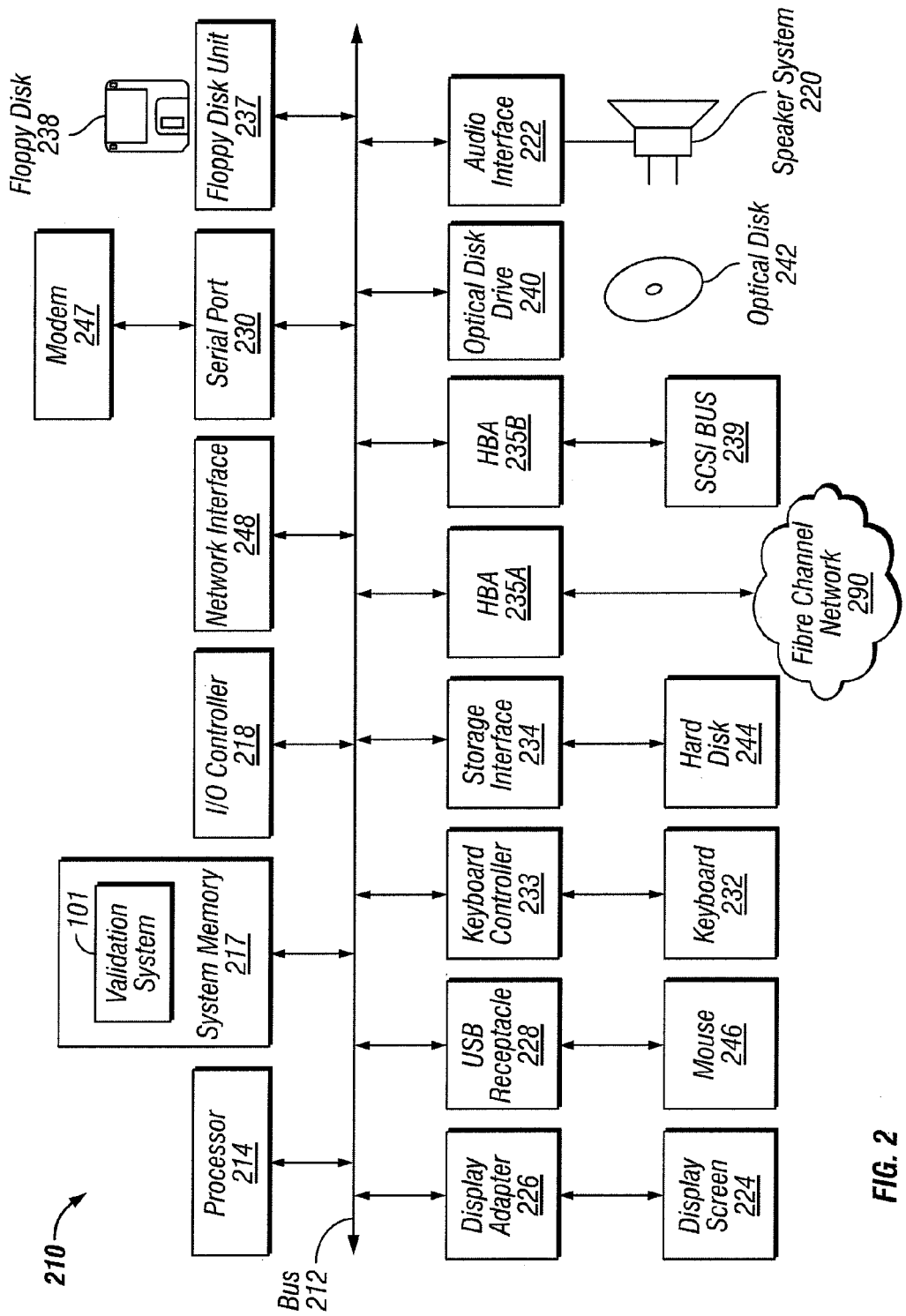
FIG. 2 is a block diagram of a computer system suitable for implementing a validation system for validating the detection of spam based entities in a social networking context, according to some embodiments.

FIG. 2 is a block diagram of a computer system 210 suitable for implementing a validation system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the validation system 101 is illustrated as residing in system memory 217. The workings of the validation system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
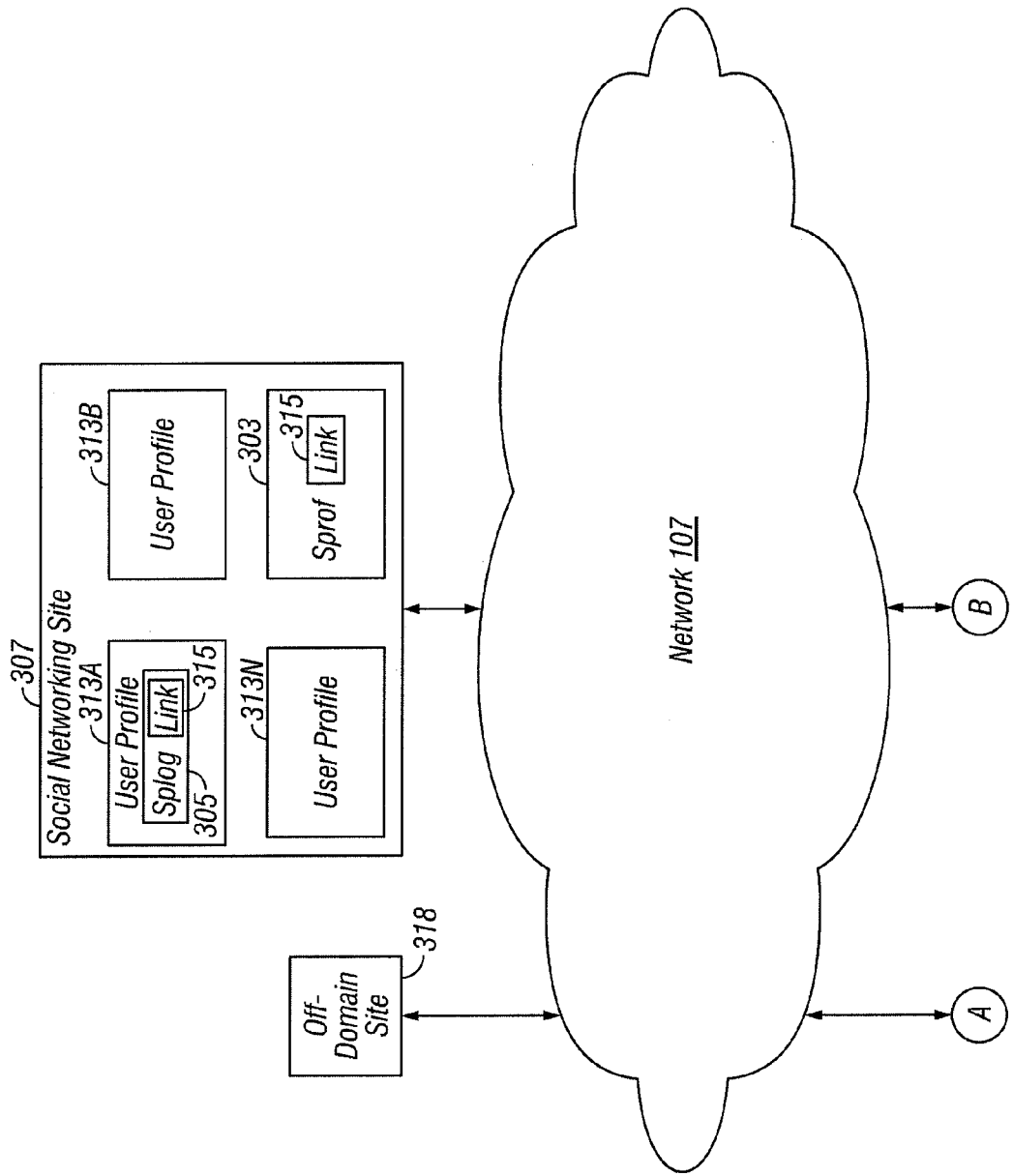
FIG. 3 is a block diagram of a validation system for validating the detection of spam based entities in a social networking context, according to some embodiments.
Figure 3:
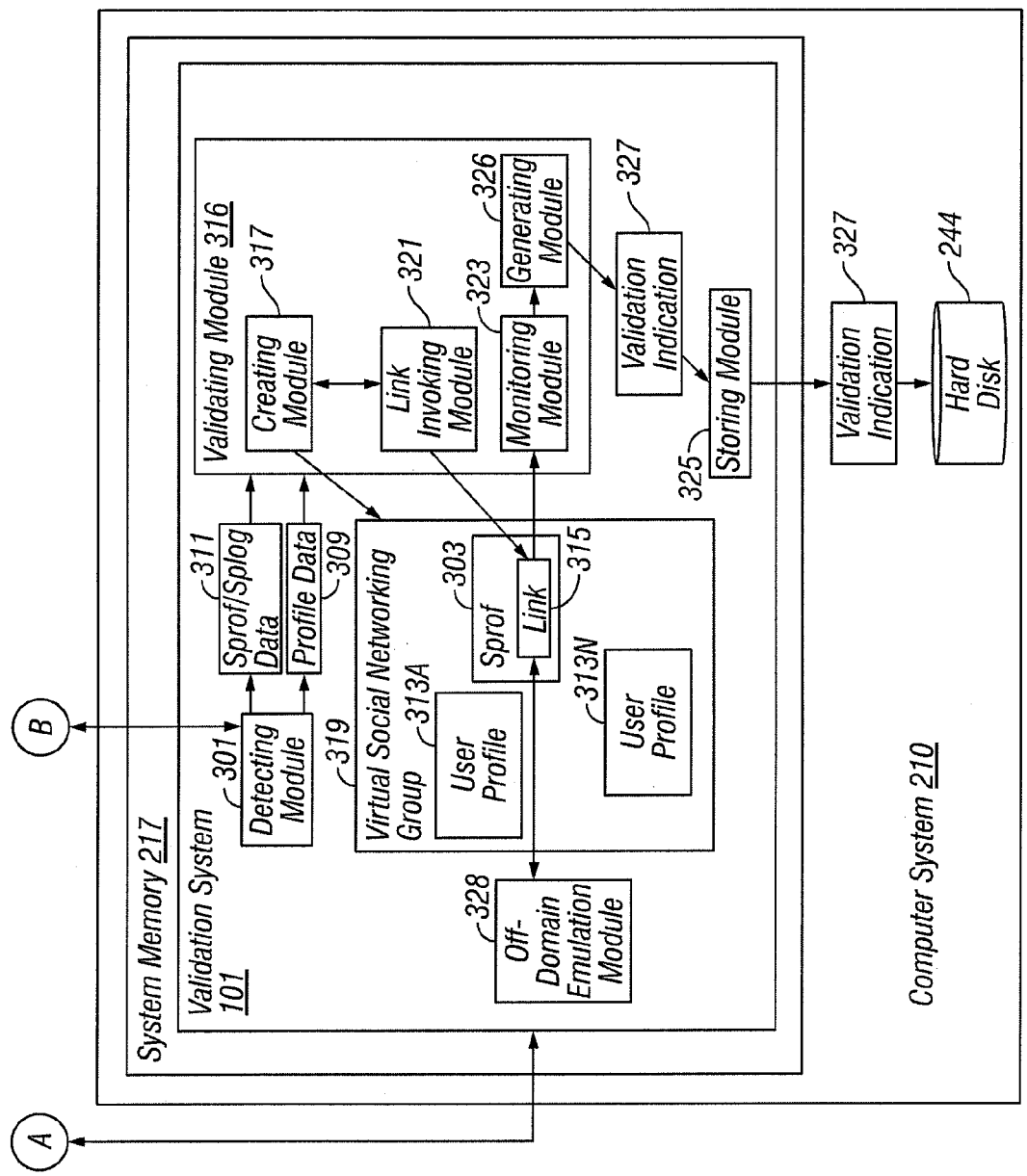

FIG. 3 illustrates a validation system 101 for validating the detection of social networking spam based entities such as sprofs 303 and splogs 305, according to some embodiments. This validation system 101 is illustrated as residing in the system memory 217 of a computer system 210, which as described above can comprise a client 103 or a server 105. In some embodiments, the functionality of the validation system 101 is distributed between multiple computer systems 210. It is to be understood that although modules of the validation system 101 are illustrated in FIG. 3 as separate entities, the illustrated validation system 101 represents a collection of functionalities, which can be instantiated as fewer, more or overlapping modules as desired. It is to be understood that the modules of the validation system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the validation system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a detecting module 301 of the validation system 101 identifies suspected sprofs 303 and/or splogs 305 (or other, similar types of social networking spam based entities) in a social networking site 307, for example by using conventional temporal or profiling techniques. When the detecting module 301 detects a suspected sprof 303 or splog 305, the detecting module 301 passes data 311 concerning the suspected sprof 303 or splog 305 to a validating module 316, to determine whether the detection is valid or instead comprises a false positive. The detecting module 301 can also pass data 309 concerning user profiles 313 on the social networking site 307 suspected of being targeted or otherwise affected by the suspected sprof 303 or splog 305.

This data 309 can comprise sufficient information to emulate the user profiles 313 as part of a virtual social networking group 319, as described in more detail below.

Responsive to receiving data 311 concerning suspected sprof 303 or splog 305, a virtual social networking group creating module 317 creates a virtual social networking group 319, to be used in validating the detection. In FIG. 3, the creating module 317 is illustrated as being a sub-module of the validating module 316, but other organizations and architectures for this functionality can be used in other embodiments. In one embodiment, the creating module 317 creates a virtual emulation of a subset of the social networking site 307 in which the suspected sprof 303 or splog 305 was detected. More specifically, the creating module 317 reproduces, through emulation, a group of user profiles 313 from the social networking site 307, the group comprising the suspected sprof 303 (or the user profile 313 containing the suspected splog 305), and additional user profiles 313 which the detecting module 301 indicates are targeted or affected by the suspected sprof 303 or splog 305. This created virtual social networking group 319 supports basic navigational and scripting functionalities, to facilitate the invocation of links 315 within suspected sprofs 303 and splogs 305 as explained in greater detail below.

Groups within social networking sites 307 comprise users that belong to the same social networking "circle," and are commonly defined as "friends" within the social network context. There can be several levels of friendships in a social network. Active friends are those that generally post content to the user profiles 313 of others, whereas voyeurs are those that generally only view other user's profiles 313. Using techniques such as a modified version of the Kleinberg authoritative hub algorithm, the creating module 317 can define members of a social networking group. Conventionally, Kleinberg's algorithm is used to identify authoritative sources on a specific topic within hyperlinked search results. In a social networking context, Kleinberg's algorithm can be adapted to define a group relationship between user profiles 313, based on communication activity between the user profiles 313 such as the posting of content. Each user profile 313 is treated as a bi-directionally linked hub, and traffic between the user profiles 313 is used to define weighted links between members of a group. Others techniques, such as an adjacency list or other weighted routing methods can be used as well for defining a social networking group As described below, in some embodiments the creating module 317 uses a pre-defined virtual social networking group 319, as opposed to emulating a specific group from the social networking site 307.

The creating module 317 uses the data 309 from the detecting module 301 identifying user profiles 313 suspected of being targeted or otherwise affected by the suspected sprof 303 or splog 305 to create a corresponding virtual social networking group 319 that emulates the specific group of interest on the social networking site 307. The detecting module 301 can feed this data 309 to the creating module 317 in real time, so that the creating module 317 can identify the group to emulate. In other embodiments, the detecting module 301 defines the group on the social networking site 307, and passes information concerning the identified group to the creating module 317, so that the creating module 317 can create the virtual social networking group 319.

It is to be understood that although the virtual social networking group 319 emulates an actual group on the social networking site 307, the virtual social networking group 319 is not part of the social networking site 307 itself, but is instead isolated therefrom, for example by being located in the system memory 217 of the computer system 210 on which the validation system 101 resides. Note also that the virtual social networking group 319 includes an emulation of the user profile 313 suspected to comprise a sprof 303 or contain a splog 305, and thus includes the link(s) 315 that are suspected of pointing to sprof 303 or splog 305 associated, off-domain sites 318. As described in more detail below, these links 315 are invoked, and results of the link invocation are emulated and monitored. This results in controlled execution of whatever functionality results from following these links 315.

In some embodiments, rather than emulate a specific group from the social networking site 307, the creating module 317 uses a pre-defined virtual social networking group 319 for a specific social networking environment (e.g., MySpace or Facebook). In this case, the creating module 317 adds a copy of the specific user profile 313 which is suspected of comprising a sprof 303 or containing a splog 305 into the pre-defined virtual social networking group 319. The copy of the suspected user profile 313 that is added to the virtual social networking group 319 includes the link(s) 315 that are suspected of pointing to sprof 303 or splog 305 associated, off-domain sites 318.

Once the virtual social networking group 319 is created, a link invoking module 321 invokes the links 315 within the suspected sprof 303 or splog 305. An off-domain emulating module 328 emulates the traffic to and from the suspected sprof 303 or splog 305 resulting from the invocation of the link 315, and returns valid results that indicate to the sprof 303 or splog 305 containing the link 315 that the invocation of the link 315 executed correctly. Note however that this occurs not on the actual social networking site 307, where the sprof 303 or splog 305 can cause harm, but in the isolated, monitored environment of the virtual social networking group 319. The off-domain emulating module 328 also allows any resulting iterative operations, such as self propagation to other user profiles 313, to occur within the isolated context of the virtual social networking group 319. The off-domain emulating module 328 passes the results from emulating the link invocation (including those from any attempted iterative operations) to a result monitoring module 323, which monitors and processes the results.

The result monitoring module 323 monitors the results of the invocation of the links 315. If the invocation results in the attempts to publish content on other user profiles 313 within the virtual social networking group 319, or attempts to negotiate to a suspicious off-domain site 318, the user profile 313 containing the link 315 is validated as being an active sprof 303, or as containing an active splog 305. Where the sprof 303 or splog 305 does attempt to publish content to other user profiles 313, the monitoring module 323 can also observe how this is attempted. For example, some sprofs 303 and splogs 305 wait before attempting to propagate to other user profiles 313, whereas others use a shotgun approach. The monitoring module 323 can collect metadata concerning the behavior of the sprof 303 or splog 305, which can be stored and/or shared with other parties as described below. If invoking the link 315 neither attempts to publish content on other user profiles 313 within the virtual social networking group 319 nor attempts to negotiate to a suspicious off-domain site 318, the user profile 313 containing the link 315 is not validated as being an active sprof 303, or as containing an active splog 305. It is to be understood that what factors are used to classify off-domain sites 318 as suspicious is a variable design parameter. In some embodiments, a blacklist (not illustrated) documents known suspicious sites 318, e.g., spammer and/or Pay Per Click (PPC) sites 318. In other embodiments, an off-domain site 318 not appearing on a white list (not illustrated) is grounds for classifying the site 318 as being suspicious. In other embodiments, the content of given off-domain sites 318 is analyzed to detect suspicious properties, e.g., PPC features or adult oriented content.

Responsive to the monitored results of the invocation of the links 315, a generating module 326 generates a validation indication 327, which indicates whether or not the suspected profile 313 has been validated as comprising a sprof 303 or containing a splog 305. The validation indication 327 can also contain metadata about the operation of the suspected profile 313 collected by the monitoring module 323, as well as a signature (created by, e.g., the generating module 326) to allow subsequent identification of the suspected profile 313, e.g., by simple detection methods executed on a social networking site 307. A storing module 325 can store the generated validation indication 327 (including any associated metadata) on, for example, a local or remote computer readable medium. The validation indication 327 can also be transmitted to, for example, a central security server (not illustrated) and/or an administrator of the social networking site 307. Note that the validation system 101 receives data 311 concerning suspected sprofs 303 and splogs 305 as input, and transforms the received data 311 into validation indications 327, which specify whether suspected profiles 313 actually comprise sprofs 303 or contain splogs 305. As described above, these validation indications 327 can be stored locally or remotely, and/or distributed as desired.

Figure 4:
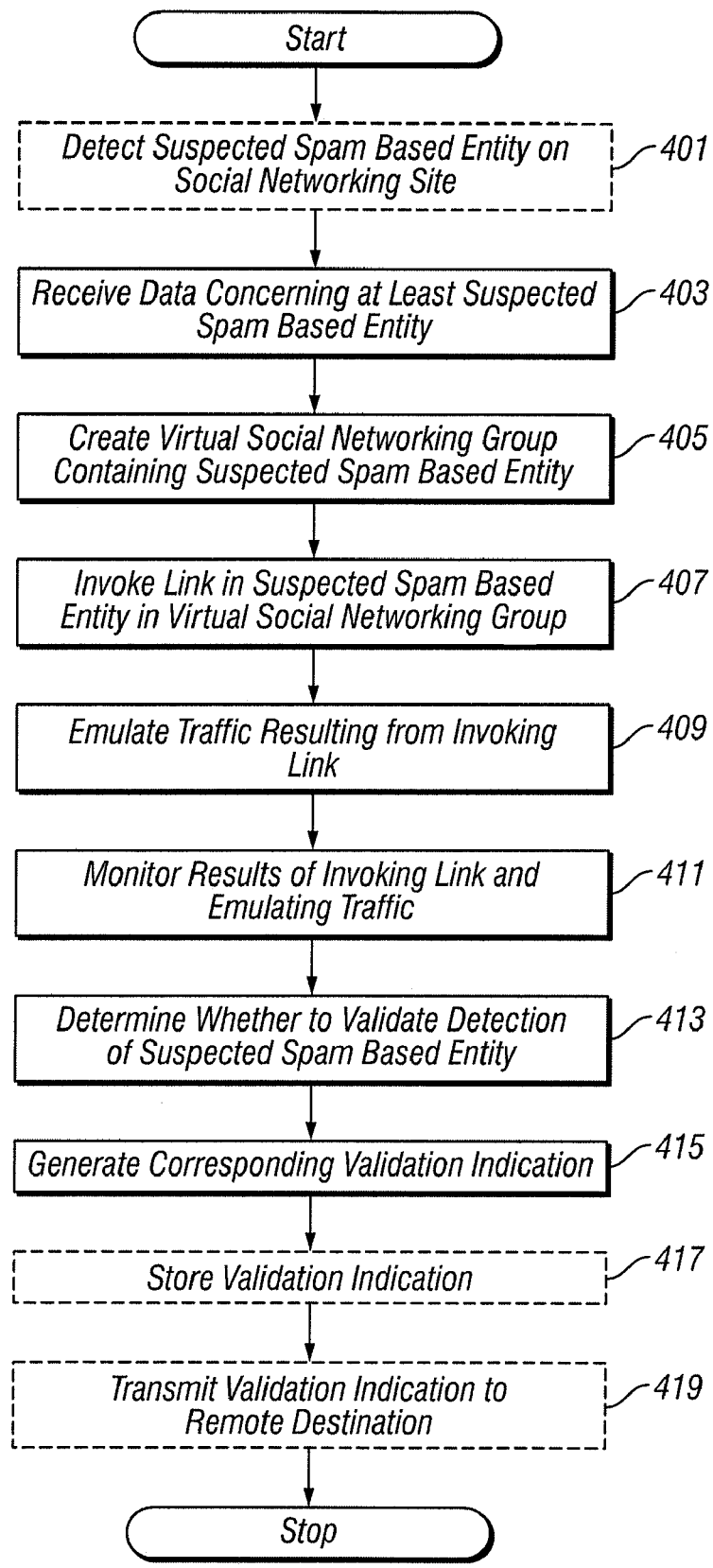
FIG. 4 is a flowchart illustrating steps for validating the detection of spam based entities in social networking contexts, according to some embodiments.

FIG. 4 is a flowchart illustrating steps for a validation system 101 (FIG. 1) validating the detection of spam based entities in social networking contexts, according to some embodiments. As illustrated, in some embodiments a detecting module 301 (FIG. 3) detects 401 a suspected spam based entity (such as a sprof 303 (FIG. 3) or a splog 305 (FIG. 3)) on a social networking site 307 (FIG. 3). A validation module 316 (FIG. 3) receives 403 data concerning detection of the suspected spam based entity. For example, in some embodiments the validation module 316 (FIG. 3) can receive 403 data 311 (FIG. 3) concerning the detection of a specific suspected spam based entity and/or data concerning user profiles 309 (FIG. 3) suspected of being affected by one or more spam based entities. The creating module 317 (FIG. 3) creates 405 a virtual social networking group 319 (FIG. 3) that is isolated from the social networking site 307 (FIG. 3). (For example, by being created 405 in the system memory 217 (FIG. 2) of the computer system 210 (FIG. 2) on which the validation system 101 (FIG. 1) resides.) The created virtual social networking group 319 (FIG. 3) emulates user profiles 313 (FIG. 3) on the social networking site 307 (FIG. 3), including, for example, a suspected spam based entity and user profiles 313 (FIG. 3) suspected of being targeted thereby.

In one embodiment, the creating module 317 (FIG. 3) creates 405 the virtual social networking group 319 (FIG. 3) by defining a social networking group on the social networking site 307 (FIG. 3) (for example, by using a modified version of Kleinberg's authoritative hub algorithm), such that the defined group comprises a user profile 313 (FIG. 3) suspected of being a spam based entity and user profiles 313 (FIG. 3) suspected of being affected by that spam based entity. The creating module 317 (FIG. 3) then emulates the user profiles 313 (FIG. 3) of the defined social networking group, in order to create 405 the virtual social networking group 319 (FIG. 3). In another embodiment, the creating module 317 (FIG. 3) creates 405 the virtual social networking group 319 (FIG. 3) by inserting an emulation of a user profile 313 (FIG. 3) suspected of comprising a spam based entity into a pre-defined, virtual social networking group 319 (FIG. 3).

In any case, a link invoking module 321 (FIG. 3) invokes 407 at least one link 315 (FIG. 3) in an emulated, suspected spam based entity in the created virtual social networking group 319 (FIG. 3). An off-domain emulating module 328 (FIG. 3) emulates 409 traffic to and from the emulated suspected spam based entity, the traffic resulting from the invoking of the link 315 (FIG. 3). A monitoring module 323 (FIG. 3) monitors 411 results of invoking the link 315 (FIG. 3) and emulating the resulting traffic.

Responsive to the monitored results of the invoking and emulating operations, a generating module 326 (FIG. 3) determines 413 whether to validate the suspected sprof 303 (FIG. 3) or splog 305 (FIG. 3) as being a bona fide spam based entity, and generates 415 a corresponding validation indication 327 (FIG. 3). This determination can be made, for example, based on an attempt by the suspected spam based entity to publish content on another user profile 313 (FIG. 3) within the virtual social networking group 319 (FIG. 3), and/or an attempt to negotiate to a suspicious off-domain site 318 (FIG. 3). In some embodiments, a storing module 325 (FIG. 3) stores 417 the validation indication 327 (FIG. 3), and/or transmits 419 the validation indication 327 (FIG. 3) to a remote destination.

Figure 5:
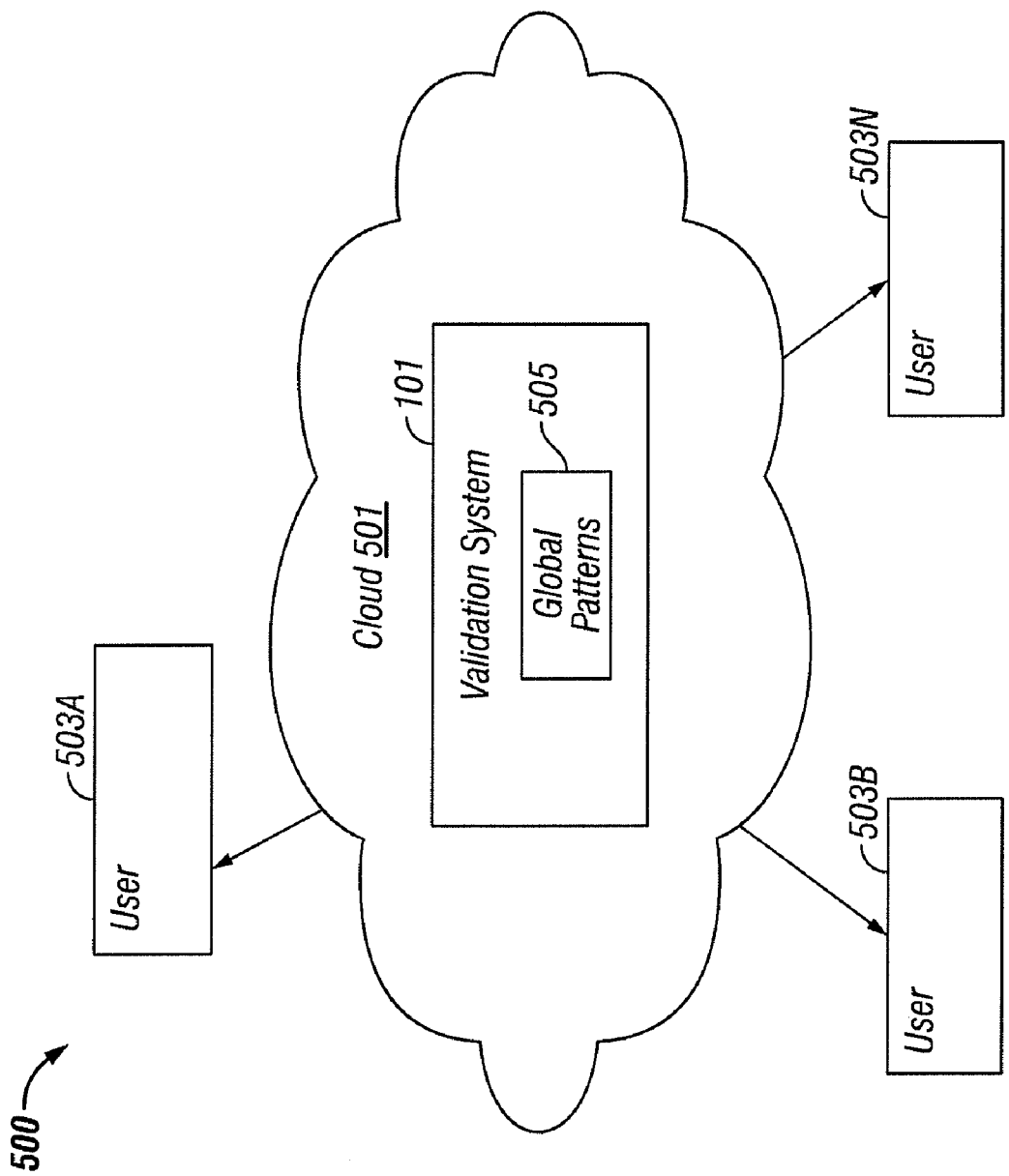
FIG. 5 is a block diagram of a validation system for validating the detection of spam based entities in a social networking context being provided as a service within a cloud computing environment, according to some embodiments.

FIG. 5 illustrates an embodiment in which the validation system 101 is provided as a service within a cloud computing environment 500. In cloud computing, dynamically scalable resources are provided to users 503 (e.g., social networking sites 307) as a service over a cloud 501, which is typically the Internet or another large network 107. Cloud computing provides infrastructure and functionality as a service, mapping resources to individual users 503 based on their real-time computing needs. Cloud computing services are typically provided to multiple users 503 from one or more servers 105, accessed from a web browser or other interface, while the application(s) and corresponding data are stored on the servers 105. Users 503 need not have knowledge of the underlying technology infrastructure "in the cloud" that supports them.

In a cloud computing context, multiple social networking sites 307 can access the validation system 101 via the cloud 501 to facilitate sprof 303 and splog 305 detection. The cloud based validation system 101 can identify specific sprof 303 and splog 305 infestations on individual social networking sites 307, as well as identify global sprof 303 and splog 305 patterns 505 occurring across multiple social networking sites 307. The cloud based validation system 101 can store the global sprof 303 and splog 305 patterns 505, as well as provide them to administrators of social networking sites 307, a central security server (not illustrated), or other targets as desired. As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for validating the detection of spam based entities in social networking contexts, the method comprising the steps of:
- receiving, by a computer, data concerning detection, in a social networking site, of at least one suspected social networking spam based entity;
- creating, by a computer, a virtual social networking group, the created virtual social networking group emulating 1) a plurality of user profiles on the social networking site and 2) the at least one suspected spam based entity, the created virtual social networking group being isolated from the social networking site;
- invoking, by a computer, at least one link in the emulated at least one suspected spam based entity in the created virtual social networking group;
- emulating, by a computer, traffic to and from the emulated at least one suspected spam based entity in the created virtual social networking group, the traffic resulting from the invoking of the at least one link;
- monitoring, by a computer, results of the invoking of the at least one link and the emulating of the resulting traffic to and from the emulated at least one suspected spam based entity;
- responsive to the monitored results of the invoking of the at least one link and the emulating of the resulting traffic to and from the emulated at least one suspected spam based entity, determining, by a computer, whether to validate the at least one suspected spam based entity as comprising a spam based entity; and
- generating, by a computer, a validation indication specifying at least whether the at least one suspected spam based entity comprises a spam based entity.

2. The method of claim 1 further comprising:
- receiving, by a computer, data concerning at least one user profile in the social networking site, the at least one user profile being suspected of being affected by the suspected spam based entity; and
- creating, by a computer, the virtual social networking group to emulate the at least one user profile being suspected of being affected by the suspected spam based entity and the at least one suspected spam based entity.

3. The method of claim 1 wherein creating, by a computer, a virtual social networking group, the created virtual social networking group emulating 1) a plurality of user profiles on the social networking site and 2) the at least one suspected spam based entity, further comprises:
- defining, by a computer, a social networking group on the social networking site, the defined social networking group comprising a user profile suspected of comprising a spam based entity and user profiles suspected of being affected by the spam based entity; and
- emulating, by a computer, the user profiles of the defined social networking group.

4. The method of claim 3 wherein defining, by a computer, a social networking group on a social networking site further comprises:
- using, by a computer, a modified version of Kleinberg's authoritative hub algorithm to define the social networking group.

5. The method of claim 1 wherein creating, by a computer, a virtual social networking group, the created virtual social networking group emulating 1) a plurality of user profiles on the social networking site and 2) the at least one suspected spam based entity, further comprises:
- receiving, by a computer, data concerning a defined social networking group on the social networking site, the defined social networking group comprising a user profile suspected of comprising a spam based entity and user profiles suspected of being affected by the spam based entity; and
- emulating, by a computer, the user profiles of the defined social networking group.

6. The method of claim 1 wherein creating, by a computer, a virtual social networking group, the created virtual social networking group emulating 1) a plurality of user profiles on the social networking site and 2) the at least one suspected spam based entity, further comprises:
- inserting, by a computer, an emulation of a user profile suspected of comprising a spam based entity into a predefined, virtual social networking group.

7. The method of claim 1 wherein determining, by a computer, whether to validate the at least one suspected spam based entity as comprising a spam based entity further comprises:
- determining, by a computer, to validate the at least one suspected spam based entity as comprising a spam based entity responsive to at least one result from a group of results consisting of:
- an attempt to publish content on at least one other user profile within the virtual social networking group; and
- an attempt to negotiate to a suspicious off-domain site.

8. The method of claim 1 further comprising performing at least one additional step from a group of steps consisting of:
- storing, by a computer, the validation indicator; and
- transmitting, by a computer, the validation indicator to at least one remote destination.

9. The method of claim 1 wherein the at least one suspected social networking spam based entity further comprises at least one from a group consisting of:
- a spam-profile; and
- a spam-blog.

10. At least one computer readable storage medium for validating the detection of spam based entities in social networking contexts, the computer readable storage medium comprising:
- program code for receiving data concerning detection, in a social networking site, of at least one suspected social networking spam based entity;
- program code for creating a virtual social networking group, the created virtual social networking group emulating 1) a plurality of user profiles on the social networking site and 2) the at least one suspected spam based entity, the created virtual social networking group being isolated from the social networking site;
- program code for invoking at least one link in the emulated at least one suspected spam based entity in the created virtual social networking group;
- program code for emulating traffic to and from the emulated at least one suspected spam based entity in the created virtual social networking group, the traffic resulting from the invoking of the at least one link;
- program code for monitoring results of the invoking of the at least one link and the emulating of the resulting traffic to and from the emulated at least one suspected spam based entity;
- program code for, responsive to the monitored results of the invoking of the at least one link and the emulating of the resulting traffic to and from the emulated at least one suspected spam based entity, determining whether to validate the at least one suspected spam based entity as comprising a spam based entity; and program code for generating a validation indication specifying whether the at least one suspected spam based entity comprises a spam based entity.

11. The at least one computer readable storage medium of claim 10 further comprising:
program code for receiving data concerning at least one user profile in the social networking site, the at least one user profile being suspected of being affected by the suspected spam based entity; and
program code for creating the virtual social networking group to emulate the at least one user profile being suspected of being affected by the suspected spam based entity and the at least one suspected spam based entity.

12. The at least one computer readable storage medium of claim 10 wherein the program code for creating a virtual social networking group, the created virtual social networking group emulating 1) a plurality of user profiles on the social networking site and 2) the at least one suspected spam based entity, further comprises:
program code for defining a social networking group on the social networking site, the defined social networking group comprising a user profile suspected of comprising a spam based entity and user profiles suspected of being affected by the spam based entity; and
program code for emulating the user profiles of the defined social networking group.

13. The at least one computer readable storage medium of claim 12 wherein the program code for defining a social networking group on a social networking site further comprises:
program code for using a modified version of Kleinberg's authoritative hub algorithm to define the social networking group.

14. The at least one computer readable storage medium of claim 10 wherein the program code for creating a virtual social networking group, the created virtual social networking group emulating 1) a plurality of user profiles on the social networking site and 2) the at least one suspected spam based entity, further comprises:
program code for receiving data concerning a defined social networking group on the social networking site, the defined social networking group comprising a user profile suspected of comprising a spam based entity and user profiles suspected of being affected by the spam based entity; and
program code for emulating the user profiles of the defined social networking group.

15. The at least one computer readable storage medium of claim 10 wherein the program code for creating a virtual social networking group, the created virtual social networking group emulating 1) a plurality of user profiles on the social networking site and 2) the at least one suspected spam based entity, further comprises:
program code for inserting an emulation of a user profile suspected of comprising a spam based entity into a pre-defined, virtual social networking group.

16. The at least one computer readable storage medium of claim 10 wherein the program code for determining whether to validate the at least one suspected spam based entity as comprising a spam based entity further comprises:
program code for determining to validate the at least one suspected spam based entity as comprising a spam based entity responsive to at least one result from a group of results consisting of:

an attempt to publish content on at least one other user profile within the virtual social networking group; and
an attempt to negotiate to a suspicious off-domain site.

17. The at least one computer readable storage medium of claim 10 further comprising program code for performing at least one additional step from a group of steps consisting of:
storing the validation indicator; and
transmitting the validation indicator to at least one remote destination.

18. The at least one computer readable storage medium of claim 10 wherein the at least one suspected social networking spam based entity further comprises at least one from a group consisting of:
a spam-profile; and
a spam-blog.

19. A computer system configured to validate the detection of spam based entities in social networking contexts, the computer system comprising:
a processor;
a system memory;
a virtual social networking group creating module residing in the system memory, for 1) receiving data concerning detection, in a social networking site, of at least one suspected social networking spam based entity and
for 21 creating a virtual social networking group, the created virtual social networking group emulating 1) a plurality of user profiles on the social networking site and 2) the at least one suspected spam based entity, the created virtual social networking group being isolated from the social networking site;
a link invoking module residing in the system memory, for invoking at least one link in the emulated at least one suspected spam based entity in the created virtual social networking group;
an off-domain emulating module residing in the system memory, for emulating traffic to and from the emulated at least one suspected spam based entity in the created virtual social networking group, the traffic resulting from the invoking of the at least one link;
a result monitoring module residing in the system memory, for 1) monitoring results of the invoking of the at least one link and the emulating of the resulting traffic to and from the emulated at least one suspected spam based entity and;
for 2), responsive to the monitored results of the invoking of the at least one link and the emulating of the resulting traffic to and from the emulated at least one suspected spam based entity, determining whether to validate the at least one suspected spam based entity as comprising a spam based entity; and
a generating module residing in the system memory, for generating a validation indication specifying whether the at least one suspected spam based entity comprises a spam based entity.

20. The computer system of claim 19 being further configured in the form of at least one from a group consisting of:
a client;
a server; and
a cloud computing based distributed system.

* * * * *

UNITED STATES PATENT AND TRADEMARK OFFICE
CERTIFICATE OF CORRECTION

PATENT NO. : 8,150,779 B1  Page 1 of 1
APPLICATION NO. : 12/476069
DATED : April 3, 2012
INVENTOR(S) : William Joseph Gauvin It is certified that error appears in the above-identified patent and that said Letters Patent is hereby corrected as shown below:

IN THE CLAIMS:

Col. 12, line 25, claim 19, replace "21" with "2)"

Signed and Sealed this
Nineteenth Day of June, 2012

David J. Kappos
*Director of the United States Patent and Trademark Office*